United States Patent [19]
Bacher et al.

[11] Patent Number: 5,783,225
[45] Date of Patent: Jul. 21, 1998

[54] APPARATUS FOR PROCESSING THERMOPLASTIC SYNTHETIC PLASTICS MATERIAL

[76] Inventors: Helmut Bacher, Bruck/Hausleiten 17; Helmuth Schulz, Badstrasse 20, both of St. Florian A-4490; Georg Wendelin, Waldbothenweg 84, Linz A-4033, all of Austria

[21] Appl. No.: 950,111

[22] Filed: Oct. 16, 1997

Related U.S. Application Data

[63] Continuation of Ser. No. 663,237, filed as PCT/AT94/00199 Dec. 20, 1994, abandoned.

[30] Foreign Application Priority Data

Dec. 21, 1993 [AT] Austria ................................. 2577/93
Dec. 16, 1994 [AT] Austria ................................. 2349/94

[51] Int. Cl.[6] ....................................................... B29B 13/00
[52] U.S. Cl. .................... 425/202; 366/76.1; 366/76.93; 425/205; 425/449
[58] Field of Search .......................... 425/205, 202, 425/208, 449; 366/76.1, 76.93, 77, 79, 80, 89

[56] References Cited

U.S. PATENT DOCUMENTS

| | | | |
|---|---|---|---|
| 3,183,553 | 5/1965 | Slater | 425/449 |
| 3,475,787 | 11/1969 | Heston | 425/202 |
| 3,475,788 | 11/1969 | Heston | 425/202 |
| 3,563,514 | 2/1971 | Shattuck | 425/205 |
| 3,850,415 | 11/1974 | Mansen | 259/191 |
| 3,954,366 | 5/1976 | Fields | 425/208 |
| 4,171,196 | 10/1979 | Maillefer | 425/208 |
| 4,222,728 | 9/1980 | Bacher | 425/305.1 |
| 4,894,001 | 1/1990 | Petschner | 425/205 |
| 5,302,019 | 4/1994 | Henschel et al. | 366/80 |
| 5,356,280 | 10/1994 | Ponzielli | 425/205 |

FOREIGN PATENT DOCUMENTS

| | | |
|---|---|---|
| A 0 171 756 | 2/1986 | European Pat. Off. . |
| C 917 571 | 7/1959 | Germany . |
| 1909818 | 10/1969 | Germany . |
| 1729198 | 6/1971 | Germany . |
| A 21 12 306 | 2/1972 | Germany . |
| A 32 27 983 | 3/1983 | Germany . |
| A 32 33 841 | 3/1983 | Germany . |
| 1368488 | 8/1971 | United Kingdom . |
| 1422731 | 1/1976 | United Kingdom . |
| 2072083 | 9/1981 | United Kingdom . |
| WO A 93 25312 | 4/1993 | WIPO . |

*Primary Examiner*—Jay H. Woo
*Assistant Examiner*—Ivrie A. Schwartz
*Attorney, Agent, or Firm*—Salter & Michaelson

[57] ABSTRACT

An apparatus for plasticizing thermoplastic synthetic plastics material includes a screw (13) which rotates within a housing (12) and plasticizes the synthetic plastics material which is supplied by a supply mechanism (27) through an intake opening (10) of the housing (12) of the screw (13). The housing (12) of the screw (13) is provided on its inner wall with at least two wide pockets (23,24). These pockets (23,24) extend in longitudinal direction of the screw (13) and are separated from each other by ribs (25,26) which are narrow, when compared with the width of the pockets. One pocket (24) is open towards the intake opening (10), the other pockets (23) are closed by at least one rib (25,26) of the housing (12) of the screw (13) with respect to the intake opening (10). In order to improve filling of the screw (13), the supply mechanism (27) for the synthetic plastics material to be treated cooperates with the screw (13). This supply mechanism (27) stuffs the synthetic plastics material into the intake opening (10) of the housing (12) of the screw (13) with a component of motion which is directed perpendicularly to the longitudinal axis of the screw (13). When seen in direction of rotation of the screw (13), the depth of the pocket (24) which is open with respect to the intake opening (10), is at least constant. Alternatively thereto or in combination therewith, at least one rib (25,26) may be adjustable in order to enable one to change the take-up behavior of the screw (13) with respect to the synthetic plastics material to be treated.

32 Claims, 4 Drawing Sheets

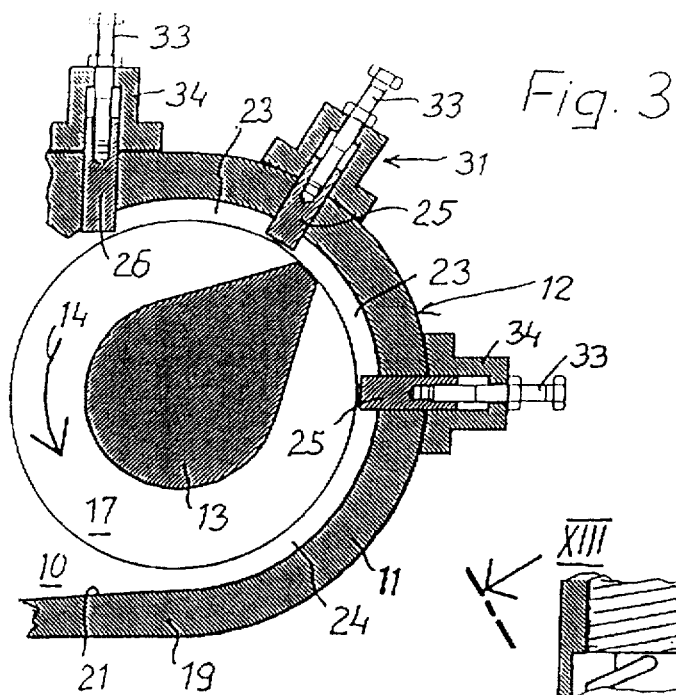
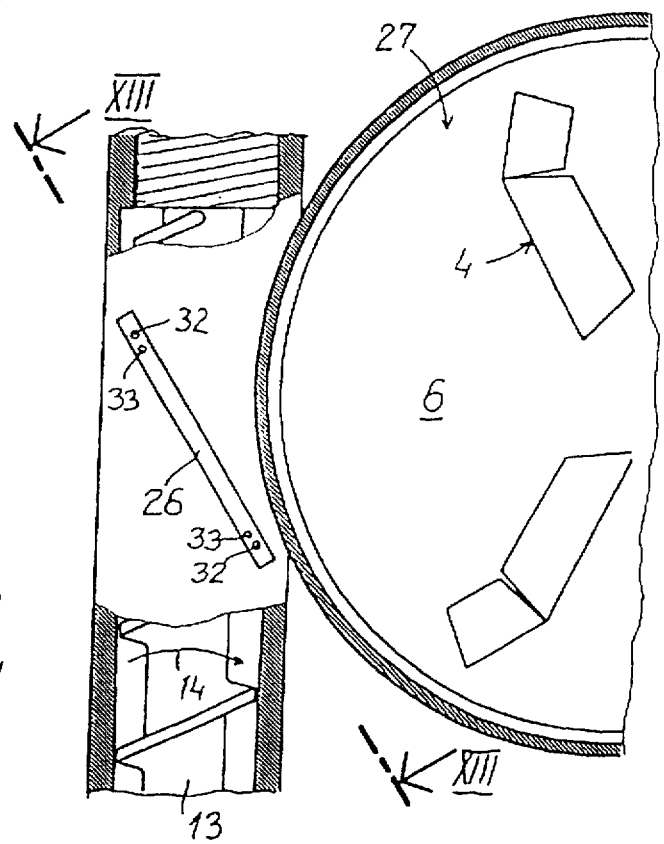
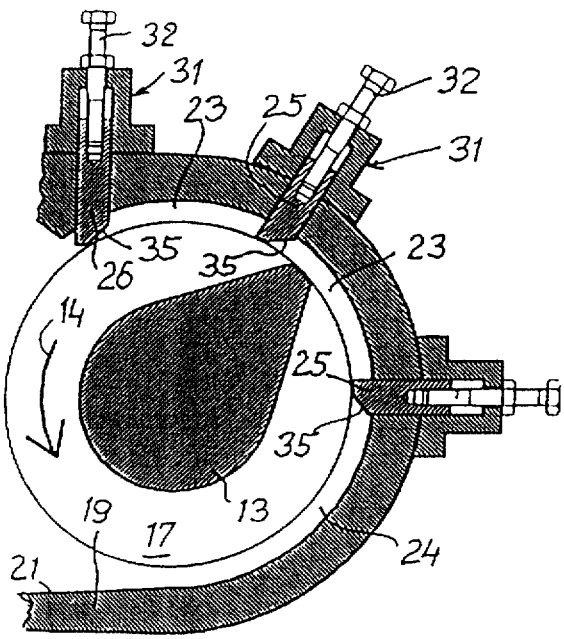

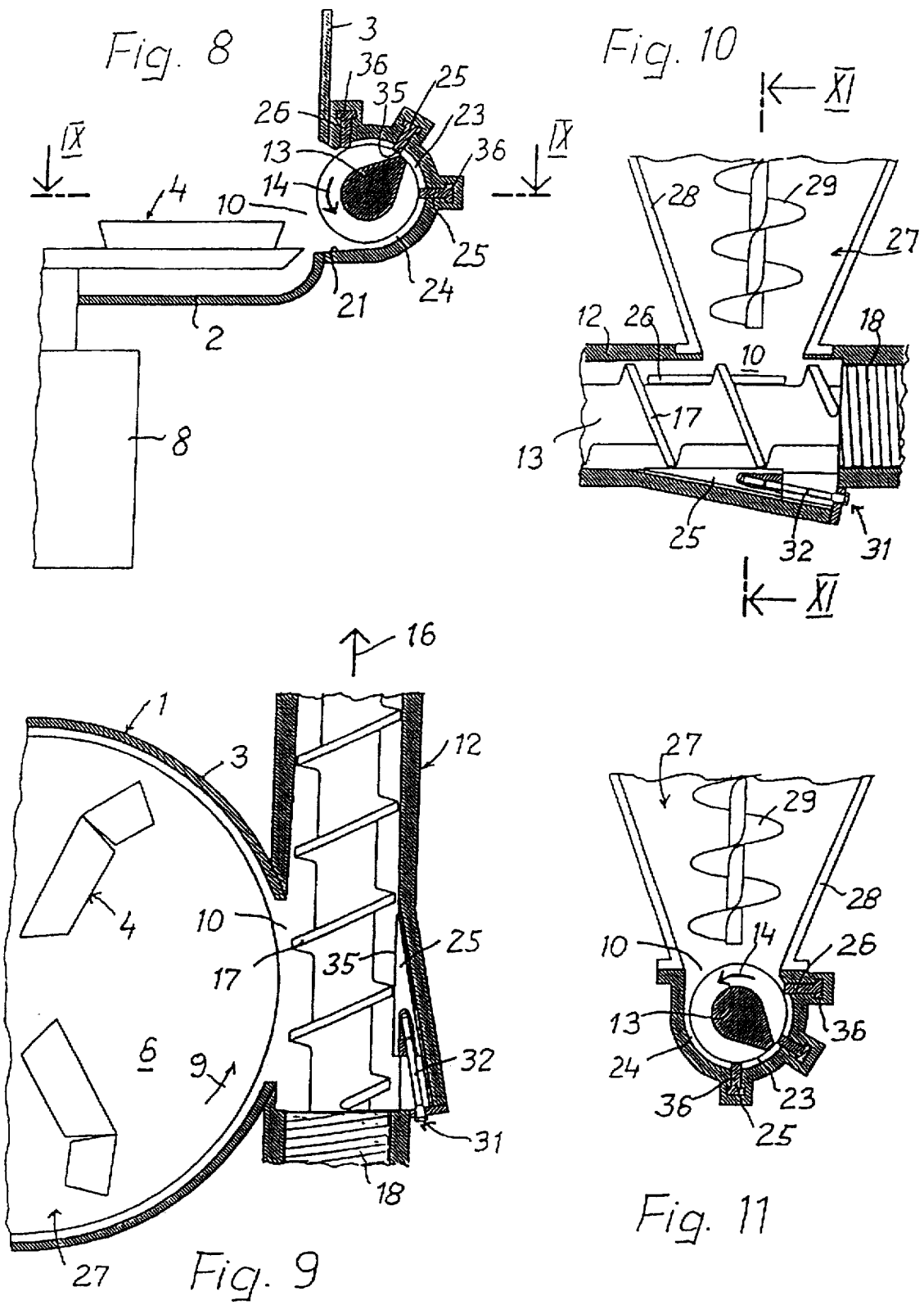

APPARATUS FOR PROCESSING THERMOPLASTIC SYNTHETIC PLASTICS MATERIAL

This is a continuation of application Ser. No. 08/663,237, filed as PCT/AT94/00199 Dec. 20, 1994, now abandoned.

BACKGROUND AND SUMMARY OF THE INVENTION

The invention relates to an apparatus for processing thermoplastic synthetic plastics material, in particular in form of foils, such as foil rests, sacks, pouches, bags, and the like, comprising an intake opening in the wall of the housing of a screw which at least conveys the synthetic plastics material introduced into the housing, and preferably also plasticises this material, into which intake opening the synthetic plastics material is supplied by means of a supply means, the housing of the screw being provided on its inner wall with wide pockets extending in longitudinal direction of the screw or curved at least over the major part of the axial region of the intake opening and, when seen in a section perpendicularly to the screw axis, surround the screw along circular ring segments and are separated from each other by ribs that are narrower, when compared with the width of the pockets, one of which pockets being open towards the intake opening, whereas another pocket is closed towards the intake opening by a further rib of the housing wall, which rib immediately neighbors the intake opening.

Apparatus for processing thermoplastic synthetic plastics material having such pockets on the inner wall of a screw housing are known (GB-A 1,368,488, DE-A 1,729,198, DE-A 3,401,817). These known apparatus, however, have considerable problems in connection with filling the screw, in particular if the thermoplastic synthetic plastics material to be processed is in form of sheetings on foils, even if these foils are comminuted. The foil elements, namely, constitute a comparatively loose mass, which is not sufficiently reliable taken along by the screw or even constitutes a bridge in the region of the intake opening of the screw housing. As a consequence thereof, the output of the screw becomes irregular, and there is even the danger of a breakdown of the output, what is of disadvantage in particular at such screws which convey towards an extruder head. Further, by economical reasons, there is always the requirement to have the efficiency of the screw as high as possible, at a given outer diameter of the screw. If one tries to meet this requirement by reducing the core diameter of the screw, experience has shown that this is limited by the considerable moment applied to the screw in order to convey the synthetic plastics material taken along by the screw and to plasticize this material so that it can be extruded.

These problems are still increased by the fact that the synthetic plastics material to be processed as a rule is not homogeneous, in particular not over a longer period of time. Synthetic plastics material of the initially described kind is frequently supplied as waste material which should be subjected to a recycling process. Within this, experience has shown that as well the kind of the supplied synthetic plastics material (chemical composition of the synthetic plastics material) as also the shape of the material to be treated varies considerably. Correspondingly, also the efficiency of the conveyance of the screw, that is the amount at which the screw takes along the synthetic plastics material and conveys it away from the intake opening, varies considerably in dependency from the kind of the material to be treated.

Further it must be considered, that by reasons of keeping the rate of utilization of existent plants, an apparatus of the initially described kind should also be able to be utilized for such kinds of synthetic plastics material which are already considerably pre-condensed or, respectively, are relatively compact, such as agglomerates or granulates. For such kinds of synthetic plastics material there is the danger that the efficiency of conveyance of the screw becomes too great so that the screw, as to say, is overfed. Further, the admissible efficiency of conveyance of the screw can also exceeded by processing synthetic plastics material which requires a high amount of energy in order to be transferred into the plasticized condition. An efficiency of the screw that is too high, or overfeeding thereof can be noticed by the fact that the driving motor of the screw operates in the region of limiting overload current, whereby mechanical elements can be overloaded. In critical cases, this may lead to a rupture of the machine.

The invention has at its object to overcome the described disadvantages and problems and to make the filling of the screw more reliable and independent from the kind of the thermoplastic synthetic plastics material to be treated. Further, the output of the apparatus for a given screw diameter should be kept as great as possible without that the driving moment of the screw reaches unadmissable regions. The invention solves this task by the features that—starting from an apparatus of an initially described kind—the supply means stuffs the synthetic plastics material into the intake opening of the screw with a component of motion directed perpendicularly to the longitudinal axis of the screw, and that at least the rib immediately neighboring the intake opening is adjustable. Both described features serve for the same purpose, namely to keep taking up of the synthetic plastics material by the screw as optimally as possible. The stuffing action of the supply means ensures that always sufficient material is at disposal in order to sufficiently fill the screw. This, in particular, is of importance if the synthetic plastics material to be treated has the initially described loose condition, for example has the shape of sheeting particles, and, therefore, tends to bridge in front of the intake opening. Such bridges are avoided by the stuffing action of the supply means. Further, however, it is ensured by the sufficient volume of the pockets that the synthetic plastics mass stuffed by the supply means into the pocket which is open towards the intake opening, is also reliably taken along by the screw and is conveyed by the screw. The wall of this pocket which is constituted by the rib following the pocket, when seen in peripheral direction of the screw, has namely the effect that the synthetic plastics material disposed within this pocket cannot rotate together with the screw and the synthetic plastics material mass being positioned within this pocket is pressed between the volutions of the screw when engaging the rib which confines this pocket, and therefore, is reliably conveyed by these volutions. The situation is similar at the at least one further pocket, into which, indeed, the synthetic plastics material can escape during rotation of the screw, however, by again supplied synthetic plastics material is always pressed forwardly (when seen in conveying direction of the screw), so that the material at the end of the pocket, at the latest, enters again between the volutions of the screw. Therefore, the pockets constitute an additional filling space in the region of the intake opening for the synthetic plastics material which is supplied under pressure and, therefore, is pre-compressed to a certain degree. This has as a consequence that the core diameter of the screw can be made greater as this was possible heretofore. A greater core diameter of the screw, however, means that a greater moment can be applied to the screw, as this was possible heretofore, so that the maximum output per time unit at a given screw diameter can be increased when compared with known embodiments.

The displaceability of at least that rib that closes the neighboring pocket with respect to the intake opening, ensures the possibility to adjust the efficiency of conveyance of the screw to the respective requirements without that the screw itself must be changed, so that no time-consuming replacement of the screw must be made and without that the moment applied to the screw must reach inadmissable regions. The change of the additional filling space confined by the respective rib, namely, has as a consequence that the ability of the screw to take up material, therefore its efficiency of conveyance, is changed, since the volume of the filling space confined by the respective rib is changed. Each adjustable rib is in its action dependent from the degree of the respective displacement, whereby in a surprising manner there is the possibility to considerably influence the conveyance efficiency of a screw in a simple manner. Thereby, this efficiency can be so controlled that the output of the apparatus which in the most cases conveys the plasticized synthetic plastics material towards an extruder head, can be adjusted to the present maximum driving moment of the screw, in dependency from the respective synthetic plastics material to be treated. Thereby, namely, the additional effect is obtained that—in dependency from the degree of displacement—a smaller or greater amount of the synthetic plastics material disposed within that pocket which is confined by this rib, is conveyed back into the intake opening, and, therefore, is not taken along by the screw in its direction of conveyance. In such a manner, the efficiency of conveyance of the screw can be changed in a simple and effective manner and an overload of the screw can be avoided, when keeping the take up volume of the screw constant. With such an apparatus, therefore, the efficiency of the supply at the intake zone can so be controlled that the output of the apparatus is adjusted to the given maximum turning movement applied to the screw. Suitably this is made so that before starting the apparatus, the displaceable ribs are retracted outwardly (with respect to the screw) into the screw housing, and during operation the adjustable ribs are advanced towards the screw to such an extent as this is admissible for the machine or its drive means, respectively. Thereby it is possible to process as well loose synthetic plastics material particles (generally having the shape of flakes or chips) as also already highly pre-condensed synthetic plastics material particles (in the extreme case: granulates) with the same extruder screw efficiently and always keeping the output at the maximum. As already mentioned, the efficiency of conveyance of the screw is increased when the ribs confining the pockets are displaced inwardly, because the ribs avoid that the synthetic plastics material rotates together with the screw and the last rib (that is the rib neighboring the intake opening) avoids that the synthetic plastics material disposed within this pocket reaches the intake opening again, and this to a degree which is the higher, the more this rib is advanced towards the screw. The retraction of each adjustable rib into the screw housing, to the contrary, means that the efficiency of conveyance of the screw is decreased, because a partial amount of the synthetic plastics material is no more taken along and conveyed by the screw so efficiently, and/or an amount of the synthetic plastics material is supplied back into the intake opening.

It is most favorable, if according to a further embodiment of the invention the depth measured in radial direction of the screw of at least the pocket which is open towards the intake opening, is constant or increases, when seen in direction of revolution of the screw. In such a manner the maximum possible take-up volume of the screw can be utilized, independent from the kind and properties of the synthetic plastics material to be treated and without the danger of an overload of the screw or its drive means, respectively.

Ribs which are adjustable in radial direction of the screw are known (DE-A-3,233,841, DE-A-2,112,306). However, none of these ribs is disposed in the inventive sense, so that the adjustment of these ribs cannot be made effective in the inventive sense, in as much within the known apparatus no stuffing action onto the material introduced into the intake opening takes place. Also the two initially described known apparatus cannot operate in the inventive manner, because on the one hand there is no stuffing action of the supply means and on the other hand the ribs cannot be displaced. Further, within some of the known apparatus the volume of the pockets is not sufficiently great because the pockets show a sickle-shaped cross section, the depth thereof decreases in direction of rotation of the screw.

According to a preferred embodiment of the invention, at least one rib is disposed at the side of the screw opposing the intake opening and constitutes a bearing abutment for the screw in that axial region of the screw that is disposed in the zone of the intake opening, for the purpose to take up the stuffing pressure exerted by the supply means. Thereby, the screw is securely bearingly supported also within the region of the intake opening. This is of advantage not only in connection with taking up the stuffing pressure of the supply means, but also in case of the intake of rigid foreign matter into the pocket which is open towards the intake opening, because such foreign matter, for example metal particles, stones or the like, considerably load the screw in the region of the intake opening. By these reasons it is suitable that at least one further rib is disposed in that region which opposes the pocket that is open towards the intake opening.

Within the spirit of the invention, the ribs between the pockets may extend parallely with respect to the axial direction of the screw, what is the most simple construction seen from the standpoint of production. However, within the spirit of the invention it is also possible to provide ribs between the pockets which extend curved in direction of rotation of the screw, preferably with a constant curvature, so that these ribs extend like the twist of a rifle. A particular favorable take-up of the synthetic plastics material by the screw is obtained within the spirit of the invention if the direction of rotation of the screw at the intake opening is directed to the open pocket. In order to ensure a filling space of the pocket that is as great as possible, it is suitable according to a further embodiment of the invention if the pockets extend in axial direction of the screw beyond the axial zone of the intake opening on both sides. Therefore, synthetic plastics material enters also the zone before the intake opening of the screw housing, when seen in direction of conveying of the screw, however, this material is always transported by the conveyance action of the screw in direction towards the extruder head or the like.

In order to enhance that the synthetic plastics material is fed back from the pockets between the volutions of the screw, according to a further embodiment of the invention, the depth of at least one pocket may continuously decrease in direction of conveyance of the screw, preferably to zero. Thereby, the synthetic plastics material disposed within the pockets is by and by taken along again by the screw. However, according to an other embodiment of the invention, the depth of at least one pocket can at first remain constant and can decrease to zero only at the end of the axial length of the pocket.

The pockets that are closed with respect to the intake opening, suitably are of equal width, however, the pocket which is open on its side towards the intake opening, as a rule, has a greater width. The ribs confining the pockets with respect to each other may be comparatively narrow. Preferably, within the spirit of the invention, there are at least two wide pockets, each one of which extending over an angle of at least 35°, when seen from the axis of the screw. Particularly favorable results are obtained if the ratio of the width of the pockets to that of the ribs is 3 to 6, preferably 4 to 5, when measured in peripheral direction of the screw.

The invention is applicable with a particular advantage to such constructions in which the screw is an extruder screw the core diameter thereof increases towards the extruder head. This increase of the inner screw diameter means a condensation of the material and thereby plasticizing thereof. This can be made with a very high output because—as already mentioned—the filling space at the intake opening is increased by the pockets without that the core diameter of the screw must be unduly reduced. However, the screw can also be a mere conveyor screw. The direction of the screw, when seen from the intake opening, is of no importance. In the most cases, the screw will be disposed horizontally, however, also an arrangement being different therefrom is possible. Further it is possible to make this direction variable by making the housing of the screw tiltable with respect to the supply means.

Particular favorable results are obtained by an apparatus in which the supply means comprises a receptacle in the bottom region thereof at least one tool is disposed that can be rotated around a vertical axis and is provided with working edges, which tool comminutes the synthetic plastics material introduced into the receptacle and/or mixes it and conveys it through an opening out of the receptacle, which opening is in connection with the intake opening of the screw housing, the opening of the receptacle wall preferably being disposed at least substantially at the level of the tool. Thereby the most favorable results are obtained if the upstream side of the pocket which is open with respect to the intake opening is disposed at least substantially at the level of the tools or of a rotor disk carrying the tools. Thereby, the centrifugal force component exerted onto the synthetic plastics material is utilized in an optimal manner in the sense of a stuffing action for filling the pocket. This centrifugal force component can be assisted by providing the tools with working edges that are backwardly displaced—when seen in peripheral direction—so that the tools press the synthetic plastics material in the manner of a spatula into the intake opening and therefore also into the pocket, in addition to the action of the centrifugal force. Filling of the screw can be further improved within the spirit of the invention by inclining the bottom of the open pocket in direction to the tools or to a rotor disk carrying the tools. Thereby, a funnel-like shape of the intake opening is obtained what enhances taking up of the synthetic plastics material from the receptacle.

A particular favorable embodiment of the invention consists in that the rib confining the pocket which is open with respect to the intake opening, is disposed at that side of the screw that opposes the intake opening. In case of a receptacle of the above described kind serving as a supply means, this rib is disposed at least substantially at the level of the axis of the screw. The pocket being open to the intake opening, therefore, is comparatively broad and extends—when measured from the axis of the screw—over an aperture angle of about 90°.

As a rule, it is suitable to make the direction of rotation of the tools at the intake opening in direction of transport of the screw, although the inverse arrangement could be used.

The most favorable arrangement is to dispose the screw substantially tangential with respect to the wall of the receptacle, however, the screw could also be disposed obliquely or even in direction of the axis of the receptacle. Further, of course also at a supply means of the above described kind, the screw housing could also be swivellably connected to the receptacle.

Such a receptacle, however, is not the only possibility for the supply means. To the contrary, within the spirit of the invention, there are numerous other possibilities for the construction of the supply means. Thus, for example, it is possible to constitute the supply means by a funnel connected to the intake opening of the screw housing, in which funnel a stuffing screw is disposed. Also in connection with such a supply means, there are the above described possibilities for the direction of the screw housing.

In order to provide for an adjustment effect of the ribs which is as great as possible, it is suitable within the spirit of the invention, to make all or the majority of the ribs displaceable independently from each other. However, it would also be possible to make only the outermost rib displaceable or adjustable, that is that rib that immediately neighbours neighbor the intake opening and in its advanced position closes the neighboring pocket with respect to the intake opening, and to make the other ribs rigid.

For adjustment of the ribs it is suitable if according to the invention each adjustable rib is guided within a longitudinal slot of the housing and is coupled with adjustment means. As a rule, this longitudinal slot extends in the screw housing in axial direction thereof, however also curvings are possible, which, as a rule, have a small degree of the bend and may extend along a helical line. A favorable embodiment consists also in that at least one of the ribs extends obliquely with respect to the longitudinal axis of the screw, the surface of this rib facing the screw being shaped according to the periphery of the screw. For longer ribs (seen in axial direction of the screw) which in the whole extend along a helical line, the respective rib should be subdivided, when seen over its length, the several portions may be adjustable independently from each other. In each case, the longitudinal slot of the housing ensures a reliable guiding of the rib. The adjustment means may, within the spirit of the invention, be constituted by pressure screws and tension screws which are abutted against the housing of the screw. However, also hydraulic adjustment means may be used and it would even be possible to make the hydraulic adjustment dependent from reaching the maximal admissible turning moment of the screw. Suitable control means for this are at disposal. When the adjustment is made by means of screws, it is to be recommended—in case of a substantially radial adjustment of the rib with respect to the screw—to provide at least two tension screws and at least two pressure screws per rib, always a pair of these screws engaging the rib in the end zone thereof. To dispose the screws at the rib ends avoids a tilting moment for the ribs and enables a particular fine adjustment. By the tension screws, the respective rib is retracted into the screw housing, by the pressure screws it is advanced in direction towards the screw.

BRIEF DESCRIPTION OF THE DRAWINGS

In the accompanying drawings, examplative embodiments of the invention are schematically shown.

FIG. 3 shows in an enlarged scale the screw and the pockets or ribs surrounding it.

FIG. 7 shows a variant to FIG. 3.

FIG. 8 shows a further embodiment in a vertical section and

FIG. 9 is a section taken along the line IX—IX of FIG. 8.

FIG. 10 shows a further embodiment in a vertical section and

FIG. 11 is a section taken along the line XI—XI of FIG. 10.

FIG. 12 shows still a further embodiment in a top view, partially in section, and FIG. 13 shows a section taken along the line XIII—XIII of FIG. 12 through a displaceable rib.

DESCRIPTION OF THE PREFERRED EMBODIMENTS

Figure 1:
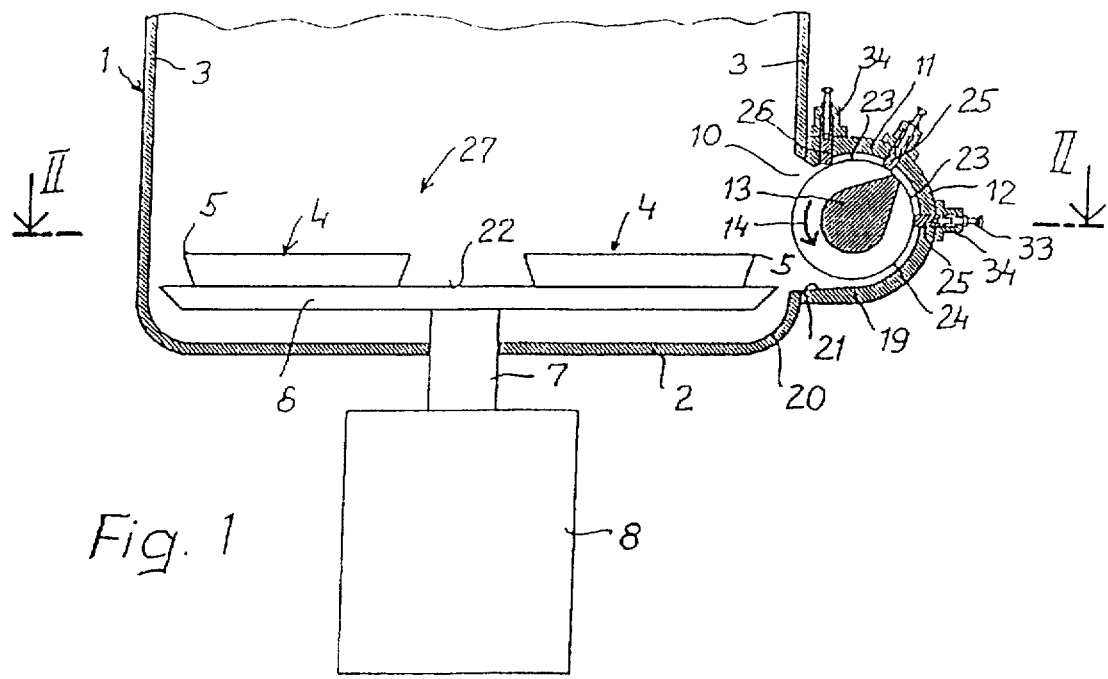
FIG. 1 shows a vertical section through a first embodiment of the apparatus.
Figure 2:
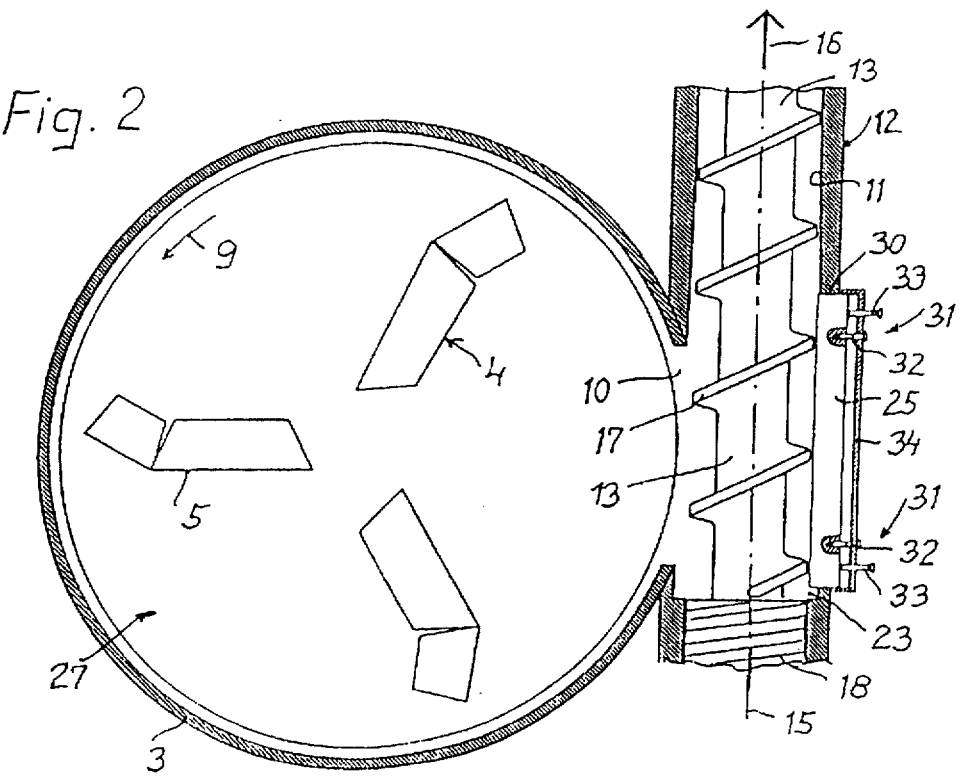
FIG. 2 is a horizontal section taken along the line II—II of FIG. 1.

The apparatus according to FIGS. 1 to 3 comprises a receptacle 1 for the treatment of the thermoplastic synthetic plastics material, which as a rule consists of thermoplastic synthetic plastics scrap material of all kind, used or not used, which material may be delivered in form of foils or sheetings or also in a more compact form. The receptacle 1 has a bottom 2 and side walls 3. The synthetic plastics material to be treated is introduced into the receptacle 1 from above by means of a loading means (not shown), if desired after a pre-treatment, for example a cleaning step or a separation step by means of which the material is freed from cores foreign bodies, as stones or metal elements. The synthetic plastics material within the receptacle 1 is treated by at least one rotating tool 4 provided with sharp working edges 5 acting on the synthetic plastics material and suitably being bent. These tools as a rule comminute and/or mix the synthetic plastics material. A comminutation takes place if the synthetic plastics material is introduced into the receptacle in form of bigger elements (foils, bottles or the like), substantially a mere mixing effect takes place when the synthetic plastics material has been previously already worked up (for example a granulate). In the most cases, during this mixing and/or comminutation, the synthetic plastics material is also heated what facilitates to plasticize the synthetic plastics material later on. The tools 4 are mounted on a rotor disk 6 which is disposed within the region of the bottom 2 and is driven for rotation in direction of the arrow 9 (FIG. 2) by a motor 8 and a shaft 7 which intersects the bottom 2.

An opening is provided in the side wall 3 of the receptacle 1 which constitutes the intake opening 10 in the wall 11 of the housing 12 of a screw 13. The screw is driven for rotation around its longitudinal axis 15 in direction of the arrow 14 by means of a drive means (not shown) and conveys the synthetic plastics material in direction of the arrow 16. If the screw 13 is no mere conveyor screw but an extruder screw, the synthetic plastics material is plasticized so that this material can be fed by the screw 13 towards an extruder head (not shown) connected to the housing 12. The volutions 17 of the screw 13 extend, when seen against the arrow 16, beyond the intake opening 10 and merge there into screw threads 18 acting as a sealing, the pitch thereof being directed in the same sense as that of the screw threads. The screw 13 or its housing 12 may be provided with a heating and/or with a cooling means.

The substantially rectangular intake opening 10 is of comparatively large size and extends in axial direction of the screw 13 at least over substantially a half volution of the screw 13. The height of the intake opening 10, measured in axial direction of the receptacle 3, amounts to at least substantially three quarters of the diameter of the screw threads 17. This ensures that the screw can take up great masses of the synthetic plastics material from the reseptacle 1. The housing 12 of the screw 13 is connected laterally substantially tangential to the side wall 3 of the receptacle 1, so that—when seen in direction of the axis 15 of the screw 13—the periphery of the screw 13 is substantially flush with the inner surface of the side wall 3 of the receptacle 1 (FIG. 1). The wall 11 of the screw housing 12 merges at the lower edge of the intake opening 10 into the transition section 20 between side wall 3 and bottom 2 of the receptacle 1 by a substantially horizontally disposed section 19. The bottom 21 of this horizontal section 21 is substantially disposed at the same level as the top surface 22 of the rotor disk 6. This ensures the optimal position for the rotor disk, however, deviations therefrom are not too critical as long as they are too great. Preferably, the bottom 21, as FIG. 1 shows, is slightly inclined towards the rotor disk 6 or its tools 4, so that the intake opening 10 shows a funnel-like shape.

The receptacle 1 with its rotating tools 4 constitutes a supply means 27 that presses the synthetic plastics material treated by it into the intake opening 10. This action, on the one hand, is created by the centrifugal force of the synthetic plastics material rotated by the rotating tools 4, on the other hand by the spatula-like action of the tools 4. Thereby, a stuffing action is exerted onto the synthetic plastics material in the region of the intake opening 10, the direction of this pressure or the stuffing action is substantially perpendicular to the longitudinal axis of the screw 13. Thereby, on the one hand, it is avoided that bridges of the synthetic plastics material can occur in the region of the intake opening 10, on the other hand, always sufficient synthetic plastics material is pressed in the region of the intake opening 10 between the single volutions of the screw 13, so that the screw is always sufficiently supplied with synthetic plastics material, even if this material has a very loose configuration, for example is formed of flakes, small foil elements or the like. In order to still improve the take-up of the synthetic plastics material which is supplied into the intake opening 10 by the tools 4 which suitably constitute knives, and in order to provide for at least one additional filling space in the region of the intake opening 10, in addition to the spaces confined by the screw threads 17, pockets 23,24 are provided in the inner wall 11 of the screw housing 12. These pockets extend in longitudinal direction of the screw 13 in the region and in the neighborhood of the intake opening 10 over at least one volution of the screw, in the example shown over about 2.5 screw threads (FIG. 2). Each pocket 23,24 is formed by a wide groove in the wall 11 of the housing 12, the width of which, when measured in peripheral direction of the screw 13, remains preferably constant over the length of the pocket. However, the depth of the pockets 23,24, measured in radial direction of the screw 13, decreases in conveyance direction (arrow 16) of the screw 13 continuously, preferably proportionally. However, the construction may also be so that this depth of each pocket 23,24 at first remains constant in direction of transport of the screw 13 and smoothly decreases only towards the end of the respective pocket 23,24 neighboring the outlet opening of the screw housing 12. Thus, the pockets 23,24 have their greatest depth always at the end of the pockets which neighbors the driven end of the screw 13. As FIG. 2 shows, this pocket end suitably is flush with the sealing threats 18. At the other end neighboring the output end of the screw 13, the pockets 23,24 merge smoothly into the cylinder-shaped inner surface of the wall 11. In each cross section of the screw 13, the depth of the pocket, measured in radial direction of the screw 13 remains constant over the width of the pocket (FIG. 1) or increases in direction of rotation (arrow 14) of the screw 13. In the examplative embodiment shown, the greatest pocket depth amounts to about 5 to 10% of the diameter of the screw 13. The several pockets 23,24 are separated from each other by ribs 25 and a further rib 26 closes the row of pockets 23 at the upper end of the intake opening 10 with respect to the interior of the receptacle. At the lower end of the intake opening 10, the first pocket 24 (counted in direction of rotation of the screw 13), however, is open towards the interior of the receptacle 1, so that there the synthetic plastics material comminuted and/or mixed by the tools 4 is pressed into the pocket 24 when the rotor disk 6 rotates. Within this receptacle 1, the above described stuffing action is effective, that means that the synthetic plastics material is pressed in by the centrifugal action of the synthetic plastics material circulating within the receptacle 1 as well as by the spatula-like action of the circulating tools 4. The synthetic plastics material pressed through the intake opening into the interior of the screw housing 12, enters not only the pocket 24 and the spaces between the several threads 17 of the screw 13, but from there fills also the two pockets 23. Since the ribs 25,26 extend in axial direction of the screw 13 and also the pockets 23,24 extend in this direction, the synthetic plastics material positioned within these pockets 23,24 cannot rotate together with the screw 13. However, by the always newly supplied synthetic plastics material and by the rotation of the screw 13, the synthetic plastics material positioned within the pockets 23,24 is advanced, also substantially in direction of the arrow 16, until the pockets 23,24 at their ends merge into the cylindrical shape of the wall 11 of the screw housing 12. During this transport of the synthetic plastics material within the pockets 23,24, the synthetic plastics material is by and by pressed between the threads 17 of the screw 13. As soon as this happens, the transport of the material by the screw 13 is in the usual manner, for example towards an extruder head or towards a further screw leading to an extruder head.

However, the construction can also be such that the ribs 25 which are positioned between two pockets 23,24 each, extend twist-like curved in longitudinal direction of the screw housing 12, and this with a curvature which follows the revolution motion of the screw 13 (arrow 14). Up to a certain extent, this may also be the case for the rib 26 positioned at the upper end of the intake opening 10. The inclination of the direction of the ribs relative to the axial direction of the screw 13, however, as a rule is small, in the most cases it does not exceed 5°. By such a twist-like configuration of the ribs 25,26 confining the pockets 23,24, the take-up of the synthetic plastics material is enhanced and a cleaning effect ist obtained, because the synthetic plastics material slides along the ribs.

Suitably, the direction of rotation (arrow 9) of the rotor disk 6 is so chosen, that the periphery of the rotor disk 6 moves along the intake opening 10 in direction of transport of the screw 13 (arrow 16). However, also the opposite direction of rotation of the rotor disk 6 is possible, because then the material pressed into the intake opening 10 by the rotor disk 6 or its tools 4, respectively, engages the screw threads 17 running in the opposite direction and thereby is guided in a particular effective manner into the pockets 23,24.

The screw 13 or its housing 12 must not exactly be positioned tangentially with respect to the receptacle 1. Thus, the screw housing 12, seen from above, may be so positioned that, when seen from above, it intersects the periphery of the rotor disk 6 like a secant, so that the screw 13 is positioned nearer to the circulating tools 4.

The tangential or secant-like positioning of the screw housing 12 with respect to the receptacle 1 has the advantage, that the drive means for the screw 13 and the outlet opening of the screw 13, for example an extruder head, can be disposed at the two front ends of the screw 13, so that the synthetic plastics material is conveyed by the screw to the extruder head or the like without any deflection. The direction of the screw 13 is suitably so chosen that the screw threads 17 at the intake opening 10 run in direction towards the bottom 21 of that pocket 24 which is open towards the interior of the receptacle 1.

The inventive arrangement is also applicable on receptacles in which more than one circulating tool set is disposed. For example, the receptacle may comprise two star wheels having vertical axes disposed adjacent each other, which star wheels carry the tools 4, the orbits of the tools 4 intersecting each other like the teeth of a gear, however do not hinder each other. It is only of importance that at least one of these tool sets stuffs the treated synthetic plastics material into the intake opening 10 with a direction of transport substantially perpendicular to the axis of the screw 13.

FIG. 3 shows that the two pockets 23 which are closed on their sides, are of equal width and each extend over an angle of at least 35°, when seen from the axis of the screw 13. It is favorable to provide wide pockets because thereby more pre-compressed synthetic plastics material, in particular in form of flakes, can be accommodated. The ribs 25,26 however are comparatively narrow, in any case substantially narrower than the pockets. It has been shown that it is suitable to choose the ratio between the width of the pockets, when measured in peripheral direction of the screw, and the width of the ribs by substantially 3 to 6, preferably by 4 to 5. Particularly favorable results have been obtained in the interval of 4.4 to 4.8 for this ratio. The ribs must not have equal width.

Further, it is possible to provide the pockets with a width that decreases in transport direction of the screw 13 (arrow 16), so that the pocket cross section is decreased not only by the decreasing pocket depth. When seen in a cross section, the pockets 23,24 always surround the screw cross section by sections of a circular ring. For the pocket 24 this holds in that region that neighbors the wedge-shaped intake gap confined by the bottom 21. The width of the lowermost pocket 24 that is open with respect to the intake opening 10, is suitably greater than that of the other pockets 23. Particularly favorable is an embodiment in which at least one rib 25 is disposed at that side of the screw 13 that opposes the intake opening 10 (FIGS. 1,3). As it is shown in FIGS. 1,3, this rib 25 confining the pocket 24 is disposed substantially at the level of the axis of the screw 13. Alternatively thereto, a second rib 25 may disposed mirror-inverted with respect to a lowermost rib 25 with respect to the axis 15 of the screw 13. Since the ribs 25 engage the periphery of the screw threads 17, a good abutment for the screw 13 is obtained by this rib 25 or by the described pair of ribs, with respect to the stuffing pressure exerted by the introduced synthetic plastics material on the screw 13, which pressure may be relatively high for correspondingly shaped tools 4. A further pressure is exerted onto the screw 13 if a compact foreign body, for example a wooden or metal piece, for example a screw, or a synthetic plastic element that was not sufficiently comminuted, is introduced. If such a foreign body enters the pocket 24, this results in a pressure component acting on the screw 13, which pressure component is directed away from the intake opening 10 and is abutted by the described positioning of the ribs. Thereby, the screw 13 is bearingly supported and reliably abutted also in the region of the intake opening 10.

In order to be able to adapt oneself to different kinds of synthetic plastics material to be treated, at least one of the ribs 25,26, in particular the rib 26, is displaceable. For this, the respective rib is guided within a longitudinal slot 30 (FIG. 2) of the housing 12 of the screw 13. This longitudinal slot 30 extends in axial direction of the screw 13. The respective rib 25 or 26 is formed by a ledge which fits into the longitudinal slot 30 and is guided along the side walls thereof, which slot intersects the wall of the housing 12 (FIG. 2). Displacement means 31 are provided for displacement of the rib 25 or 26 in the slot 30, the rib 25 or 26 being coupled with these means. Within the embodiment shown, the displacement means 31 are formed by tension screw bolts 32 and pressure screw bolts 33. The pressure screw bolts 33 engage the outer edge of the ledge of the respective rib 25 or 26 and can be screwed into screw threads of a cover member 34 which tightly closes the opening formed by the longitudinal slot 30, however leaves sufficient space for the movement of the respective rib 25 or 26. The tension screw bolts 32 can be screwed into screw threads of the ledge of the respective rib 25,26 and are abutted with their heads on the cover member 34. In the FIGS. 1 and 2, the ribs 25,26 are shown in their innermost position in which the ribs close the pockets 23,24 against each other and engage the threads of the screw 13 or at least are positioned very close to them. If the pressure screw bolts 33 are screwed back, the respective rib 25 or 26 can be retracted by the tension screw bolts 32 into the hollow space accommodated by the cover member 34. This means that the pockets 23,24 which are confined by the ribs 25, are more or less brought into connection with each other, what means that the volume of the pocket is increased. This, however, causes not an increase of the efficiency of the conveyance of the screw 13, but a decrease thereof, because now the respective rib 25 cannot more so effectively press the synthetic plastics material positioned within the pocket 24 or 23, confined by this rib, into the volutions of the screw. The retraction of the rib 26 has as a consequence that the synthetic plastics material positioned within the pocket 23 confined by this rib 26 is partially conveyed back into the intake opening 10, the amount of this synthetic plastics material being conveyed back into the opening 10 being dependent from the distance for which the rib 26 was retracted.

In such a manner, the effect which is obtained by the stuffing action of the supply means 27 formed by the circulating tools 4 and by the pockets 23,24, can be adjusted at choice. This adjustment is of advantage if the synthetic plastics material to be treated changes with respect to composition, density or power required for plasticizing, or is subject to considerable variations thereof. Any overload of the apparatus can be avoided thereby. Within this, the procedure suitably is so that the operation of the apparatus is started with ribs 25,26 which are retracted into the housing 12 or into the cover members 34. If it shows within this that the admissible maximum driving moment for the drive of the screw 13 is not reached, the ribs 25,26 confining the pockets 23,24 are displaced individually or in combination to such an extent in direction towards the screw 13 as this is admissible for the apparatus or its drive means respectively.

Thus, the conveyance efficiency of the screw 13 is increased if the ribs 25,26 are moved towards the screw 13, and is decreased if the ribs 23,24 are displaced outwardly.

The ribs 25,26 can also be displaced by means of hydraulic displacement means. Such a hydraulic displacement has the advantage, when compared with a displacement by means of screws, that, if desired, a plurality or all ribs 25,26 can be displaced in common. As a rule, however, it is more favorable to make the ribs 25,26 displaceable independently from each other. This holds in particular for the outermost rib (rib 26), since this rib gives the already mentioned additional effect of back-conveyance of the taken-up synthetic plastics material into the intake opening 10. If always a sufficient abutment for the screw 13 must be given also within the region of the intake opening 10, then it is suitable to make those ribs 25 rigid which form the abutment within the region of the intake opening 10, and to have only the rib 26 displaceable, which neighbors the intake opening 10. This ensures that the stuffing pressure exerted by the supply means 27 and also the pressure exerted by a rigid foreign body which was taken-in into the pocket 24, can always reliably be abutted. As already mentioned, a rib pair can be provided instead of one single rib 25 disposed at the level of the axis 15 of the screw 13, one rib of this pair being disposed somewhat below the axis 15, the other somewhat above thereof. If desired, also more than two ribs 25 may be provided, however the width of the pockets 23,24 should not be too small.

Figure 4:
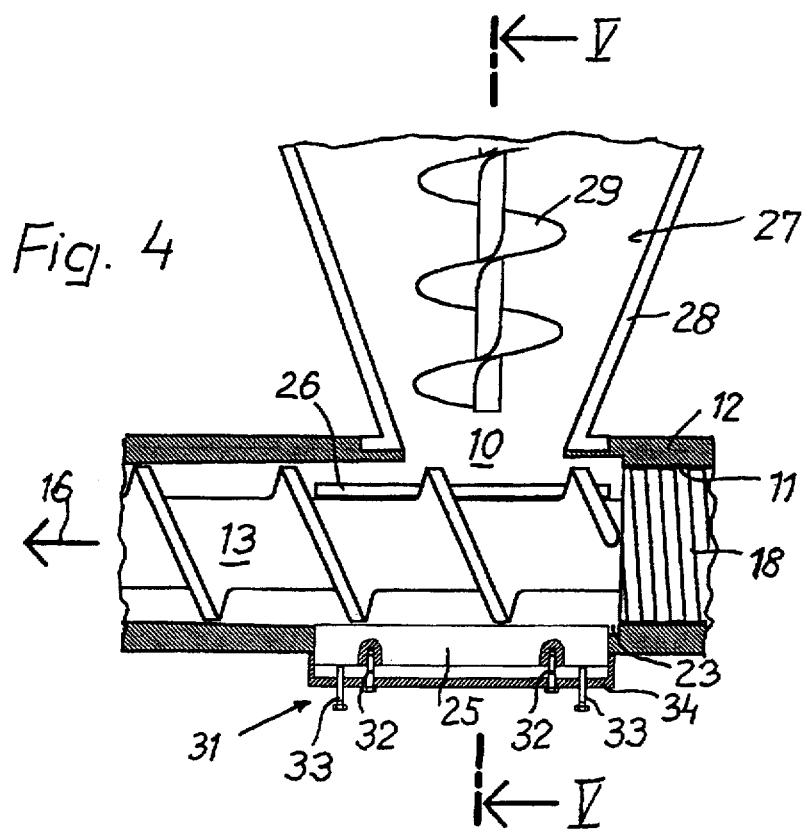
FIG. 4 shows a vertical section through a second embodiment.
Figure 5:
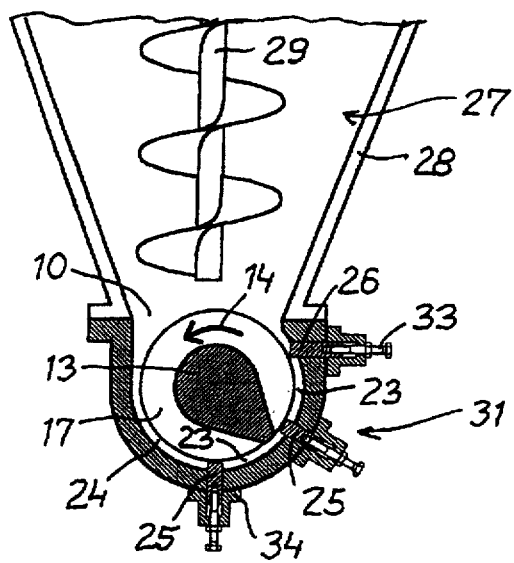
FIG. 5 is a section taken along the line V—V of FIG. 4.

Within the embodiment according to FIGS. 4 and 5, the supply means 27 comprises a funnel 28 connected from above to the intake opening 10, a supply screw 29 being positioned within this funnel. The screw 29 conveys the synthetic plastics material which was introduced into the funnel 28 from above, towards the intake opening 10 and stuffs it into this opening, the direction of this stuffing action being substantially perpendicular to the direction of the longitudinal axis of the screw 13. With respect to the adjustment of the ribs 25,26, the embodiment according to FIGS. 4 and 5 is similar to that of FIGS. 1 to 3. Within the embodiment according to FIGS. 4 and 5, however, the ribs 23,24 are longer, when compared with the intake opening 10, and these ribs extend over the entire region of the intake opening 10 as well as over the neighboring areas, whereas within the embodiment according to FIGS. 1, 2 and 3, the ribs 25,26 are only somewhat longer than the greatest dimension of the intake opening 10, which is rectangular in this case.

Figure 6:
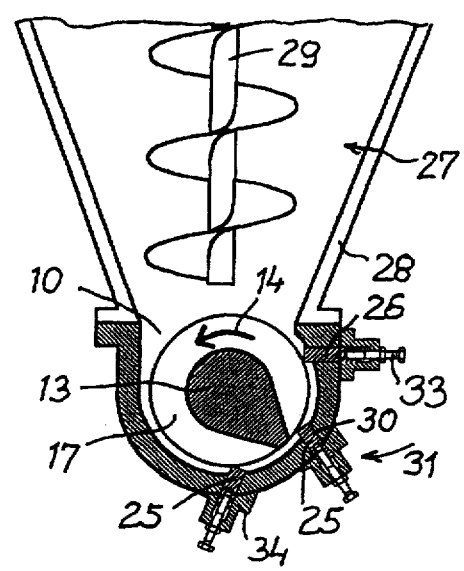
FIG. 6 shows a variant to FIG. 5.

The variant according to FIG. 6 is similar to that of FIGS. 4 and 5, however, the two ribs 25 or their guide slots 30 in the housing 12, respectively, are not disposed radially with respect to the axis of the screw 13, but obliquely, in the embodiment shown substantially tangential with respect to the core of the screw 13, the inclination being directed towards the leaving side of the screw 13. This has the advantage that by the obliquely directed walls of the ribs 25 which are engaged by the synthetic plastics material during rotation of the screw 13, the synthetic plastics material is pressed particularly effective into the volutions 17 of the screw 13. Simultaneously, a cleaning effect for the ribs 25 is obtained, so that no dead corners are formed on these ribs 25, in which synthetic plastics material may remain for a longer period and may be thermically damaged thereby. A similar effect is also obtained for the rib 26 within the embodiments according to FIGS. 1 to 5.

Within the embodiment according to FIGS. 7, which is similar to that of FIGS. 1 to 3, a similar effect as described above is obtained by the feature that the front surfaces 35 of the ribs 25,26 facing the screw 13 extend obliquely, so that these front surfaces form a wedge together with the outer periphery with the screw threads 17.

The embodiment according to FIGS. 8 and 9 differs from that according to FIGS. 1 to 3 by the feature that the ribs 25,26 confining the pockets 23 or 24 can be shifted along an obliquely disposed plane, for example within T-grooves 36 or guide means having a dove-tail cross section. These T-grooves extend in axial direction of the screw 13. By an axial displacement of the respective rib 25,26, its front surface 35 can be adjusted with respect to the screw 13 in radial direction thereof. The effect is the same as this has been described in connection with the above described embodiments. The adjustment is made by displacement means 31, for example by tension screw bolts 32 and pressure screw bolts 33, as described above.

The embodiment according to FIGS. 10 and 11 shows similar wedge-formed ribs 25,26 which are guided within T-grooves 36, however in connection with a supply means 27, the configuration thereof corresponds substantially to that according to FIGS. 4 to 6. When the ribs 25 or 26 are displaced, the take-in behavior for the synthetic plastics material at the intake opening 10 within this embodiment is also changed by the fact that, in addition to the inward or outward movement of the ribs 25 or 26, these ribs are also axially displaced so that, in particular for the rib 26, the intake opening 10 is more or less freed. In the position shown, in which the ribs are completely projected, the rib 26, for example, does not extend over the entire axial region of the intake opening 10, however, it does when the rib 26 is retracted. The effect obtained by the axial shift of the rib 26, therefore, opposes the effect obtained by the radial adjustment of the rib (with respect to the screw 13) or decreases this effect. If the contrary should be obtained, that means, if the two effects should assist each other, then only the direction of the wedge of the rib 26 must be positioned inversely, so that the tip of the wedge of the rib 26 faces the sealing threads 18.

Within the embodiment according to FIGS. 12 and 13, the general construction of the supply means 27 and of the screw 13 is similar to that of FIGS. 1 to 3. However, at least one of the ribs 25,26 does not extend in axial direction of the screw 13, but obliquely thereto, in the examplative embodiment shown, the inclination amounts to about 30°. The front surface 35 (FIG. 13) facing the screw 13 of the respective rib 25 or 26 is shaped correspondingly to the periphery of the screw threads 17, so that this front surface 35 everywhere engages the screw threads 17 (the rib displaced in its innermost position) and therefore abuts the screw 13, the ribs 27 being cleaned by the screw threads. The said oblique position of the respective rib is so chosen that, when the screw 13 is rotated, the synthetic plastics material is pressed into the volutions of the screw.

Within all embodiments, the opening, through which the treated synthetic plastics material is delivered out of the receptacle 1 by the tools 4, coincides with the intake opening 10 of the screw housing 12. This must not necessariy be so, however, these two openings may also be interconnected by a tube (not shown). As a rule, however, the direct connection is more favorable. In such a tube or also within the intake opening 10, a gate valve may be positioned by which the receptacle 1 can be closed with respect to the screw housing 12, if this is desired.

The screw 13 must not necessarily be horizontally positioned, however, it can be also disposed obliquely with respect to the horizontal direction, or even vertically. The screw 13 must not be an extruder screw, however, it is possible to construct this screw as a mere conveyor screw which transports the material, if desired by pre-plasticizing, to a proper plasticizing screw of an extruder.

What is claimed is:

1. An apparatus for processing thermoplastic synthetic plastic material, the apparatus comprising:

an elongate housing defined by a wall having an inner surface and an outer surface;

a screw extending along a longitudinal axis and conveying thermoplastic synthetic material within said housing;

an intake opening formed in said wall through which said thermoplastic material is introduced into said housing;

a receptacle for receiving the material to be processed, said receptacle being defined by walls connected to said intake opening;

supply means for stuffing said plastic material into said intake opening with a component of motion of the plastics material directed perpendicularly to the longitudinal axis of said screw, said supply means having at least one tool driven for rotation around an axis so that the tool moves relative to said walls of said receptacle near the intake opening and within said receptacle;

at least two wide pockets positioned on the inner surface of the wall of said housing, said pockets extending at least over a major part of said intake opening when viewed in a direction of the axis of the screw, and surrounding said screw along circular ring segments when viewed in a section perpendicular to the axis of the screw, one of said pockets being open adjacent said intake opening so that the material stuffed into the intake opening by the supply means can freely enter said open pocket;

ribs confining said pockets, said ribs being narrower than the width of said pockets when measured in a peripheral direction of the inner surface of the wall of said housing, one of said ribs being adjustably positioned adjacent said intake opening for closing said open pocket adjacent said intake opening, said rib being adjustable to and from the screw, said adjustable rib being disposed at an edge of the intake opening at which the periphery of the screw during its rotation leaves the housing and enters the intake opening.

2. An apparatus as set forth in claim 1, wherein the depth of at least the open pocket adjacent the intake opening is substantially constant when seen in direction of revolution of the screw.

3. An apparatus as set forth in claim 1, wherein at least one rib is disposed upon the screw opposite the intake opening and constitutes a bearing abutment for the screw at least in the axial region of the screw disposed in the area of the intake opening for relieving pressure exerted by the supply means.

4. An apparatus as set forth in claim 1, wherein the ribs extend between the pockets curved in direction of revolution of the screw.

5. An apparatus as set forth in claim 4, wherein the ribs extend along a constant curvature.

6. An apparatus as set forth in claim 1, wherein the direction of revolution of the screw at the intake opening is directed towards the open pocket.

7. An apparatus as set forth in claim 1, wherein the pockets extend in axial direction of the screw to both sides beyond the region of the intake opening.

8. An apparatus as set forth in claim 1, wherein the depth of at least one pocket continuously decreases in direction of transport of the screw.

9. An apparatus as set forth in claim 8, wherein the depth of at least one pocket remains constant in transport direction of the screw and decreases at the end of the axial length of the pocket to zero only.

10. An apparatus as set forth in claim 1, wherein the pockets which are closed with respect to the intake opening are of equal width.

11. An apparatus as set forth in claim 1, wherein at least two wide pockets, each of which extends over an aperture angle of at least thirty five degrees, are measured from the axis of the screw.

12. An apparatus as set forth in claim 1, wherein when measured in peripheral direction of the screw, the ratio between the width of the pockets and the width of the ribs is three to six.

13. An apparatus as set forth in claim 1, wherein when measured in peripheral direction of the screw, the ratio between the width of the pockets and the width of the ribs is four to five.

14. An apparatus as set forth in claim 1, wherein the rib which limits the pocket which is open towards the intake opening is disposed at the side of the screw that opposes the intake opening.

15. An apparatus as set forth in claim 1, wherein the screw is an extruder screw having a core diameter which increases towards a head of the extruder screw.

16. An apparatus as set forth in claim 1,
said at least one tool being rotatable around a vertical axis and provided with working edges, said tool comminuting synthetic plastics material introduced into the receptacle and presses the comminuted material into an opening formed in the side wall of the receptacle, which opening is in communication with the intake opening in the wall of the housing of the screw.

17. An apparatus as set forth in claim 16, wherein said tool heats the plastics material.

18. An apparatus as set forth in claim 16, wherein the open pocket is disposed at least substantially at the level of the tool.

19. An apparatus as set forth in claim 16, wherein the open pocket has a bottom that is inclined in a direction towards the tool.

20. An apparatus as set forth in claim 16, wherein the direction of rotation of the tool at the intake opening is in the direction of transport of the screw.

21. An apparatus as set forth in claim 16, wherein the screw is disposed at least substantially tangential with respect to the side wall of the receptacle.

22. An apparatus as set forth in claim 1, wherein at least two ribs are adjustable independently from each other.

23. An apparatus as set forth in claim 22, wherein each adjustable rib is guided within a longitudinal slot formed in the housing and is coupled to displacement means.

24. An apparatus as set forth in claim 23, wherein said displacement means comprises tension screws and pressure screws which are abutted on the housing.

25. An apparatus as set forth in claim 24, wherein at least two tension screws and at least two pressure screws are provided per rib.

26. An apparatus as set forth in claim 1, wherein the adjustable rib has a body in the shape of a wedge and is guided in a longitudinal direction of the wedge adjustable within the housing of the screw.

27. An apparatus as set forth in claim 26, said body of the adjustable rib having a surface facing the screw, said surface being obliquely shaped.

28. An apparatus as set forth in claim 1, wherein at least one of the ribs extends obliquely with respect to the longitudinal axis of the screw and is shaped at its surface facing the screw in a manner corresponding to the periphery of the screw.

29. An apparatus as set forth in claim 1, wherein the adjustable rib is disposed at a level of the longitudinal axis of the screw.

30. An apparatus as set forth in claim 1, wherein the depth of at least one pocket, measured in a radial direction of the screw, increases when viewed in the direction of the rotation of the screw.

31. An apparatus for processing thermoplastic synthetic plastic material, the apparatus comprising:

an elongate housing defined by a wall having an inner surface and an outer surface;

a screw extending along a longitudinal axis and conveying thermoplastic synthetic material within said housing;

an intake opening formed in said wall through which said thermoplastic material is introduced into said housing;

supply means for introducing said plastic material into said intake opening with a component of motion of the plastics material directed perpendicularly to the longitudinal axis of said screw, said supply means comprising a receptacle having a side wall, and at least one tool disposed within said receptacle, said tool being rotatable around a vertical axis and provided with working edges, said tool comminuting synthetic plastics material introduced into the receptacle and presses the comminuted material into an opening formed in the side wall of the receptacle, which opening is in communication with the intake opening in the wall of the housing of the screw;

at least two wide pockets positioned on the inner surface of the wall of said housing, said pockets extending at least over a major part of said intake opening when viewed in a direction of the axis of the screw, and surrounding said screw along circular ring segments when viewed in a section perpendicular to the axis of the screw, one of said pockets being open adjacent said intake opening;

ribs separating said pockets from each other, said ribs being narrower than the width of said pockets when measured in a peripheral direction of the inner surface of the wall of said housing; and an adjustable rib positioned adjacent said intake opening and capable of closing said open pocket adjacent said intake opening, said rib being adjustable to and from the screw, said adjustable rib being disposed at an edge of the intake opening at which the periphery of the screw during its rotation leaves the housing and enters the intake opening.

32. An apparatus for processing thermoplastic synthetic plastic material, the apparatus comprising:

an elongate housing defined by a wall having an inner surface and an outer surface;

a screw extending along a longitudinal axis and conveying thermoplastic synthetic material within said housing;

an intake opening formed in said wall through which said thermoplastic material is introduced into said housing;

supply means for introducing said plastic material into said intake opening with a component of motion of the plastics material directed perpendicularly to the longitudinal axis of said screw, said supply means comprising a funnel in connection with the intake opening, and a screw for moving synthetic plastics material disposed in the funnel towards the intake opening;

at least two wide pockets positioned on the inner surface of the wall of said housing, said pockets extending at least over a major part of said intake opening when viewed in a direction of the axis of the screw, and surrounding said screw along circular ring segments when viewed in a section perpendicular to the axis of the screw, one of said pockets being open adjacent said intake opening;

ribs separating said pockets from each other, said ribs being narrower than the width of said pockets when measured in a peripheral direction of the inner surface of the wall of said housing; and an adjustable rib positioned adjacent said intake opening and capable of closing said open pocket adjacent said intake opening, said rib being adjustable to and from the screw, said adjustable rib being disposed at an edge of the intake opening at which the periphery of the screw during its rotation leaves the housing and enters the intake opening.

* * * * *